(12) United States Patent
Li et al.

(10) Patent No.: US 7,545,454 B2
(45) Date of Patent: Jun. 9, 2009

(54) LIQUID CRYSTAL DISPLAY MODULE AND PACKAGE STRUCTURE THEREOF

(75) Inventors: Kuo-Yuin Li, Tainan County (TW); Chung-Yuan Liu, Tainan County (TW); Jia-Chang Tien, Tainan County (TW)

(73) Assignee: Himax Technologies Limited, Fonghua Village, Sinshih Township, Tainan County (TW)

( * ) Notice: Subject to any disclaimer, the term of this patent is extended or adjusted under 35 U.S.C. 154(b) by 593 days.

(21) Appl. No.: 10/906,328

(22) Filed: Feb. 15, 2005

(65) Prior Publication Data

US 2006/0077314 A1    Apr. 13, 2006

(30) Foreign Application Priority Data

Oct. 8, 2004    (TW) .............................. 93130675 A

(51) Int. Cl.
*G02F 1/1333*    (2006.01)
(52) U.S. Cl. ........................................ 349/58; 349/161
(58) Field of Classification Search ...................... 349/5, 349/58, 106, 110, 149, 150, 158, 161; 353/52, 353/54
See application file for complete search history.

(56) References Cited

U.S. PATENT DOCUMENTS

| | | | |
|---|---|---|---|
| 6,906,840 B1* | 6/2005 | Fujimori et al. | 359/237 |
| 7,123,334 B2 | 10/2006 | Kaise | |
| 2002/0071085 A1* | 6/2002 | Huang et al. | 349/149 |
| 2003/0107698 A1* | 6/2003 | Nagayama et al. | 349/149 |
| 2004/0165123 A1 | 8/2004 | Iguchi | |

FOREIGN PATENT DOCUMENTS

| | | |
|---|---|---|
| CN | 1392534 A | 1/2003 |
| CN | 1398357 A | 2/2003 |
| CN | 1523410 A | 8/2004 |

* cited by examiner

*Primary Examiner*—Dung Nguyen
*Assistant Examiner*—Tai Duong
(74) *Attorney, Agent, or Firm*—Winston Hsu

(57) ABSTRACT

A package structure for packaging a liquid crystal display (LCD) panel. The package structure includes a heat sink for positioning the LCD panel, a transparent cover against the LCD panel, and a sealing material for sealing the LCD panel within the package structure.

9 Claims, 7 Drawing Sheets

LIQUID CRYSTAL DISPLAY MODULE AND PACKAGE STRUCTURE THEREOF

BACKGROUND OF INVENTION

1. Field of the Invention

The present invention relates to a package structure for packaging an LCD panel. The package comprises a heat sink for positioning the LCD panel, a transparent cover above the LCD panel, and an adhesive for adhering the transparent cover to the heat sink in order to seal the liquid crystal panel between the transparent cover and the heat sink.

2. Description of the Prior Art

A new Liquid Crystal on Silicon (LCOS) display is an advanced product combining two kinds of VLSI (Very Large Semiconductor Integrated) and LCD display technologies. The LCOS display differs from a thin film transistor liquid crystal display (which has two glass sheets on two sides as substrates) by utilizing two substrates, one being a glass sheet on the upper side and the other being made of a semiconductor material such as silicon on the bottom side. As a result, the LCOS display can be mass produced by utilizing regular Complementary Metal Oxide Semiconductor (CMOS) procedures, thereby minimizing its area as well as raising its resolution due to the advancing development of semiconductor technology. The LCOS panels, due to their lightweight, low power consumption, and no radiation, have increasingly replaced traditional CRT monitors and are also used in portable electrical devices such as notebook computers and personal digital assistants.

Please refer to FIG. 1, which shows a conventional LCOS package. The LCOS module 10 comprises an LCOS panel 12 and a flexible printed circuit board 16 electrically coupled to the LCOS panel 12 for transferring image signals to the LCOS panel 12 in order to display an image. The conventional LCOS module 10 has no package structure; instead it directly contacts with an outside environment, so that the LCOS panel 12 and the flexible printed circuit board 16 tend to get stained by dust and vapor, negatively affecting their performance.

Please refer to FIG. 2, which shows a schematic diagram of a conventional display apparatus 20. The display apparatus 20 comprises a light source 22, a liquid crystal panel 24, a Polarization Beam Splitter (PBS) 26, a lens 28, and a screen 29. The liquid crystal panel 24 can be an LCOS panel. After the light source 22 irradiates light, the light will pass through the PBS 26 and the liquid crystal panel 24. The liquid crystal panel 24 modulates the light and generates heat. The modulated light will be reflected back to the PBS 26, pass through the lens 28 and finally arrive at the screen 29. An image is thereby projected onto the screen 29. Because the heat generated by the liquid crystal panel 24 will damage the quality of the image, how to dissipate the heat is an issue for the developer. In addition, the LCOS display's exposure to air tends to stain the display panel. Therefore, an improvement of the conventional LCOS display package is required.

SUMMARY OF INVENTION

It is therefore a primary objective of the present invention to provide a package structure for packaging an LCOS panel to solve the above-mentioned problem.

Another objective of the present invention is to provide an LCD display module having an LCD panel positioned on a heat sink.

According to the claimed invention, a package structure for packaging a liquid crystal panel comprises a heat sink for dissipating heat generated by the liquid crystal panel positioned on the heat sink, and a transparent cover located above the liquid crystal panel. The package structure employs an adhesive to adhere the transparent cover to the heat sink, sealing the liquid crystal panel between the transparent cover and the heat sink. The package structure further comprises a circuit carrier electrically coupled to the liquid crystal panel to transfer an image signal.

The transparent cover is made of glass, and the heat sink is made of metal. The transparent cover and the heat sink are sealed with a first adhesive and a second adhesive. The first adhesive is a kind of UV glue and the second adhesive is a kind of waterproof glue According to the claimed invention, a display apparatus comprises a Liquid Crystal on Silicon panel (LCOS panel) having a color filter, and a heat sink for dissipating heat generated by the liquid crystal panel positioned on the heat sink. The color filter comprises one or more colors selected from a group consisting of red, green, and blue. The display apparatus further comprises a transparent cover located above the Liquid Crystal on Silicon panel. The display apparatus employs an adhesive for sealing the liquid crystal panel between the transparent cover and the heat sink.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
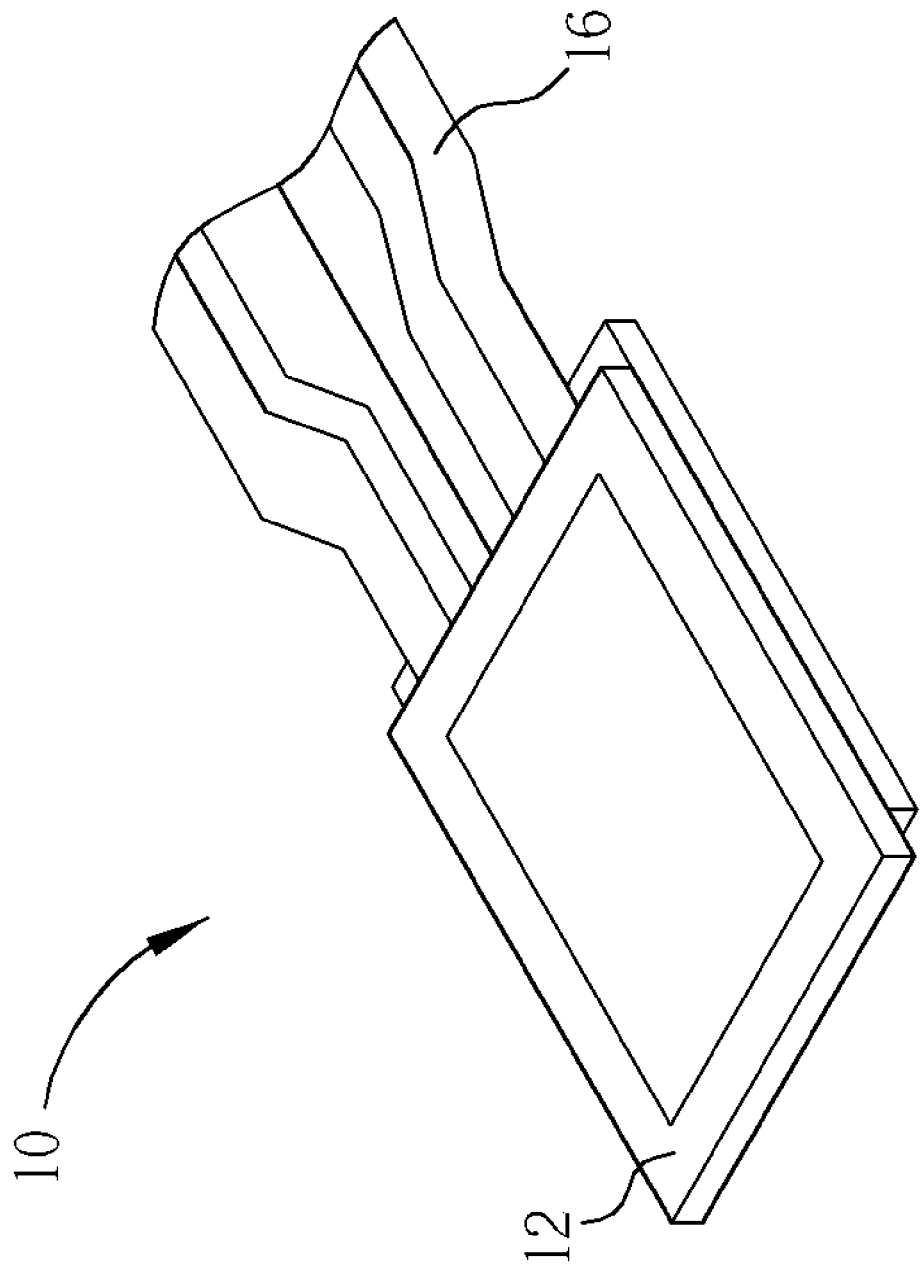
FIG. 1 is a diagram of a conventional LCOS package.
Figure 2:
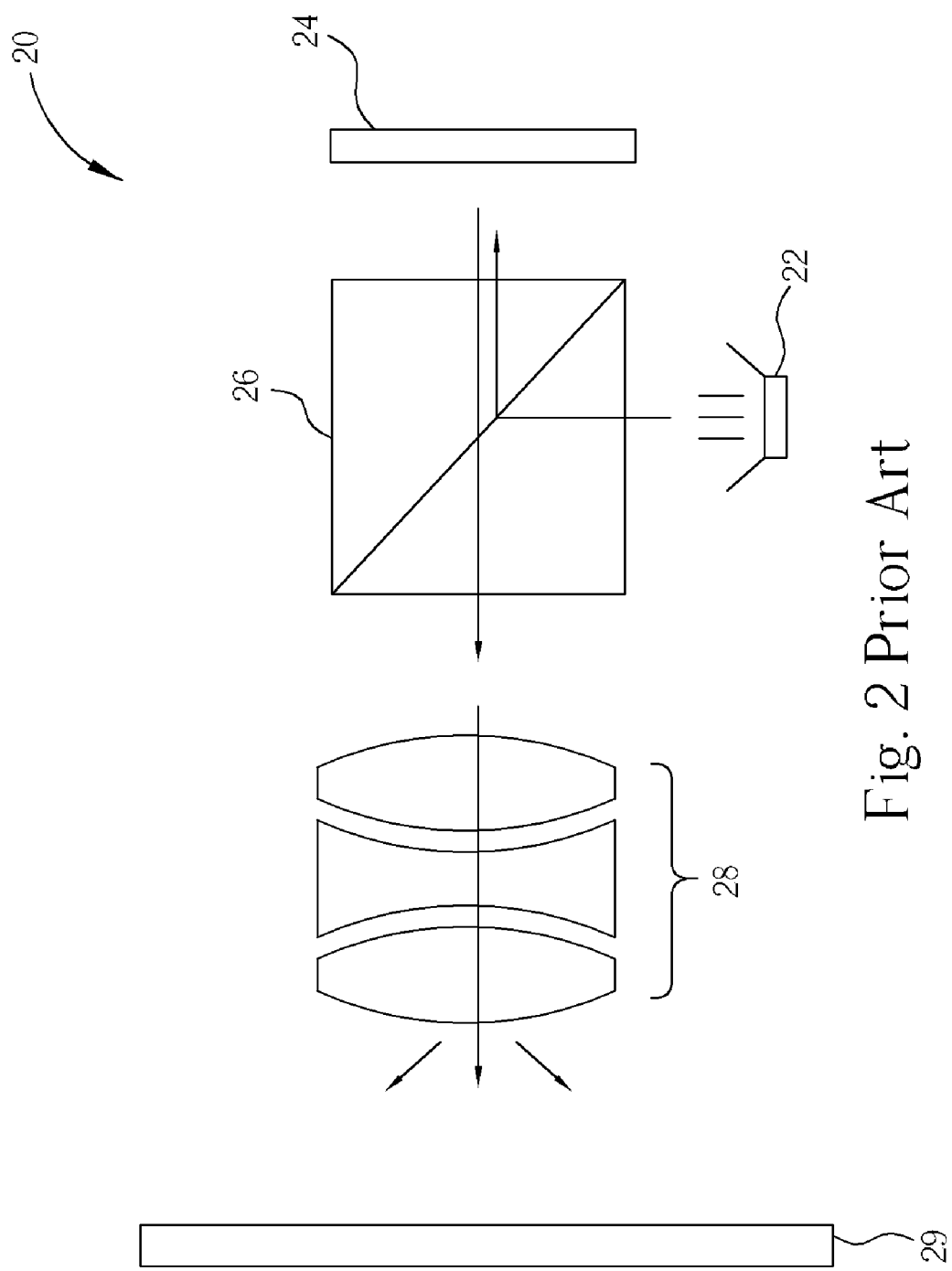
FIG. 2 is a schematic diagram of a conventional display apparatus.
Figure 3:
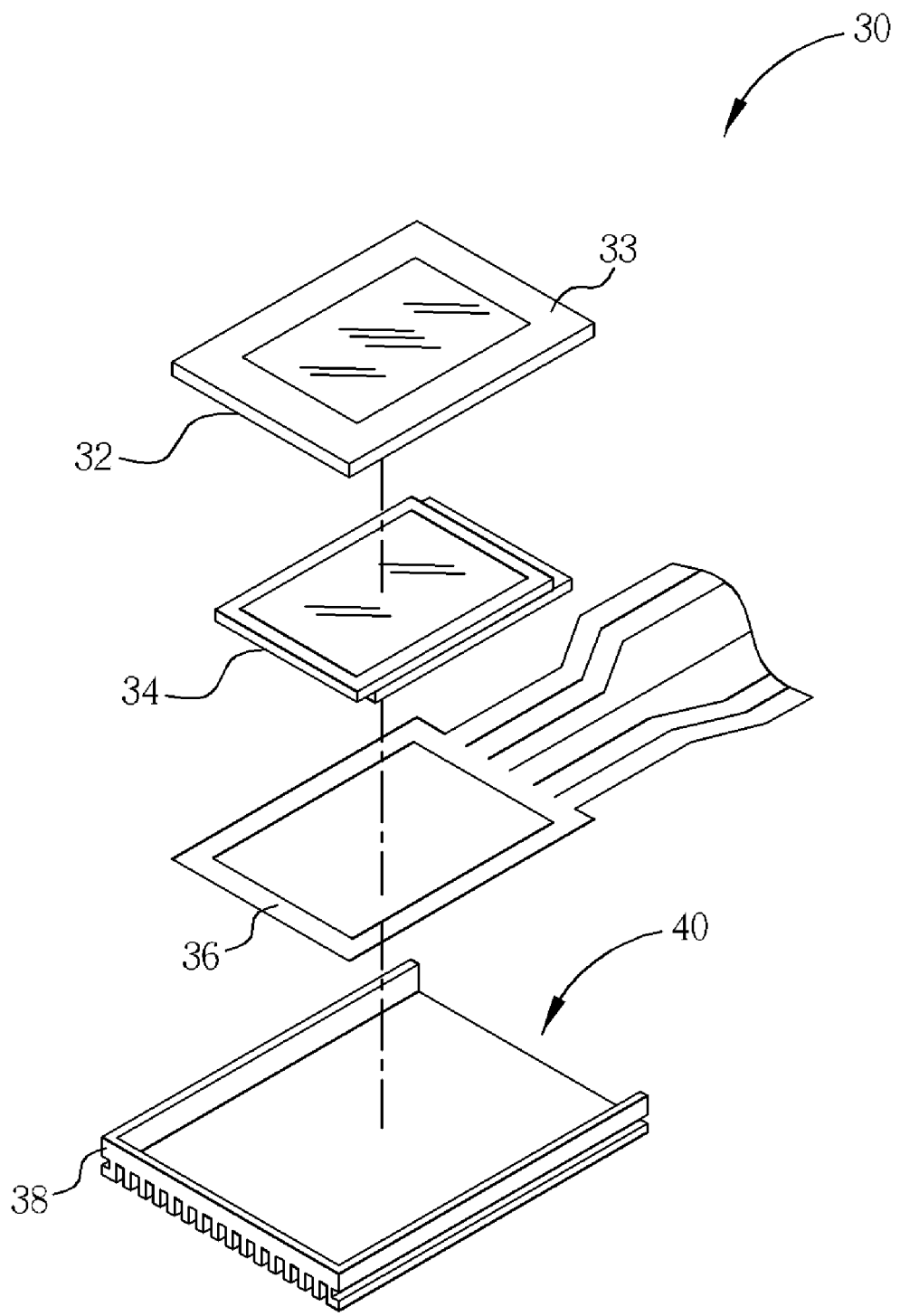
FIG. 3 is a diagram of an LCOS package structure according to the present invention.
Figure 4:
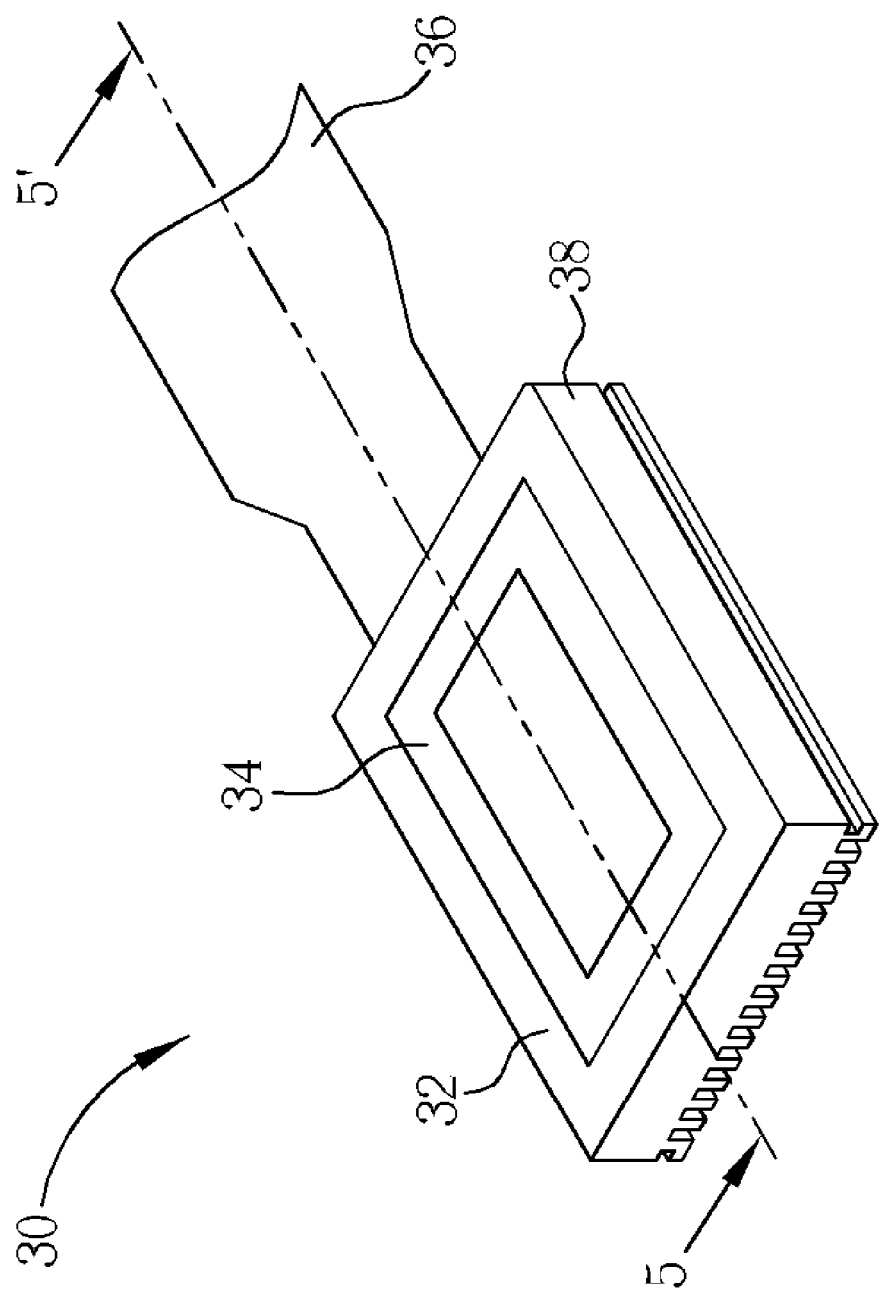
FIG. 4 is a diagram of the assembled LCOS package.

Please refer to FIG. 3 and FIG. 4. FIG. 3 shows an LCOS package structure according to the present invention. FIG. 4 is a diagram of the assembled LCOS package. The LCD display module 30 comprises a transparent cover 32 with a mask 33, an LCD panel 34, a circuit carrier 36 and a heat sink 38. The transparent cover 32 is used for protecting the LCD panel 34 from dust and scraping. The mask 33 is used for blocking unnecessary light progressing into the LCD display module 30 and avoiding influencing the optical quality. The LCD panel 34, coupled to the circuit carrier 36, is used for displaying an image based on the image signals transferred via the circuit carrier 36. The heat sink 38, affixed to the LCD panel 34, is used for dissipating heat generated by the LCD display panel 30 as strong light irradiates the display panel. Because the extra heat will degrade the optical quality of the LCD display module 30, an assembly of the heat sink 38 and the LCD panel 34 will improve such a problem. Moreover, the heat sink 38 comprises an opening for allowing the circuit carrier 36 to pass through.

The transparent cover 32 is made of glass. The mask 33 is a light shielding film stamped on peripheral area of transparent cover 32. The LCD panel 34 is a Liquid Crystal on Silicon Panel (LCOS Panel). The circuit carrier 36 is a Flexible Printed Circuit (FPC). The heat sink 38 is made of aluminum or copper. The LCD panel 34 comprises a color filter containing one or more colors selected from a group consisting of red, green, and blue. An air gap between the LCD panel 34 and the transparent cover 32 is used for isolating heat generated from the LCD panel 34. It is well known by one skilled in this art that the previously mentioned material and structure are merely examples and should not be interpreted as limitations in the present invention.

Figure 5:
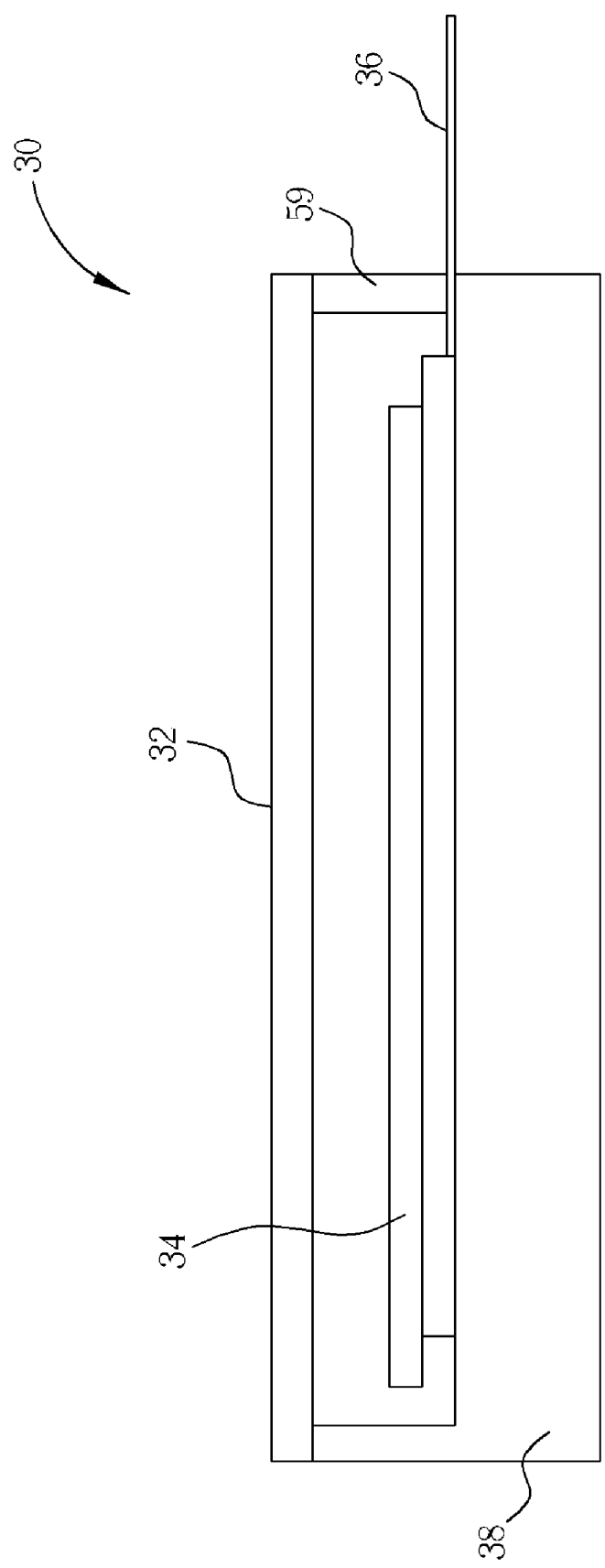
FIG. 5 is a cross-sectional view along the 5 5' line depicted in FIG. 4.

Please refer to FIG. 5, which is a cross-sectional view along the line 5 5' line depicted in FIG. 4. For simplicity, elements that have the same function as those illustrated in FIG. 4 are given the same item numbers in FIG. 5. The supporter 59 can support the transparent cover 32 and stuff the opening of the heat sink 38. The supporter 59 can be made of glass. If the heat sink 38 does not have the opening as shown in FIG. 3, the supporter 59 can be removed. In this situation, the circuit carrier 36 is flexible to climb over a wall of the heat sink 38. The adhesion (not shown in FIGS. 4 and 5) is used for adhering the transparent cover 32 to the heat sink 38, so as to seal the LCD panel 34 into the LCD display module 30, thereby achieving the objectives of water-proofing, dust-prevention, air tightness and heat dissipation.

Figure 6:
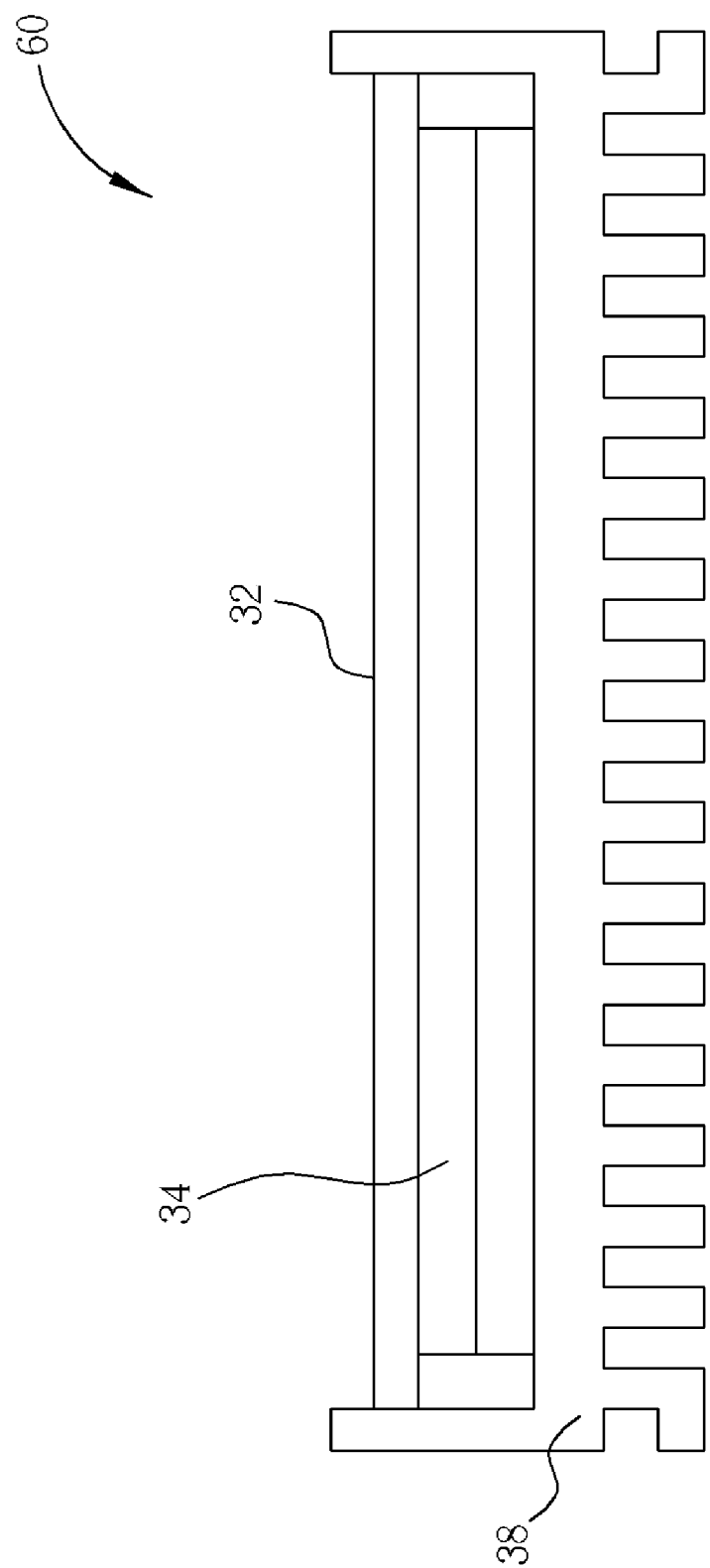
FIG. 6 is a cross-sectional view of another embodiment according to the present invention.
Figure 7:
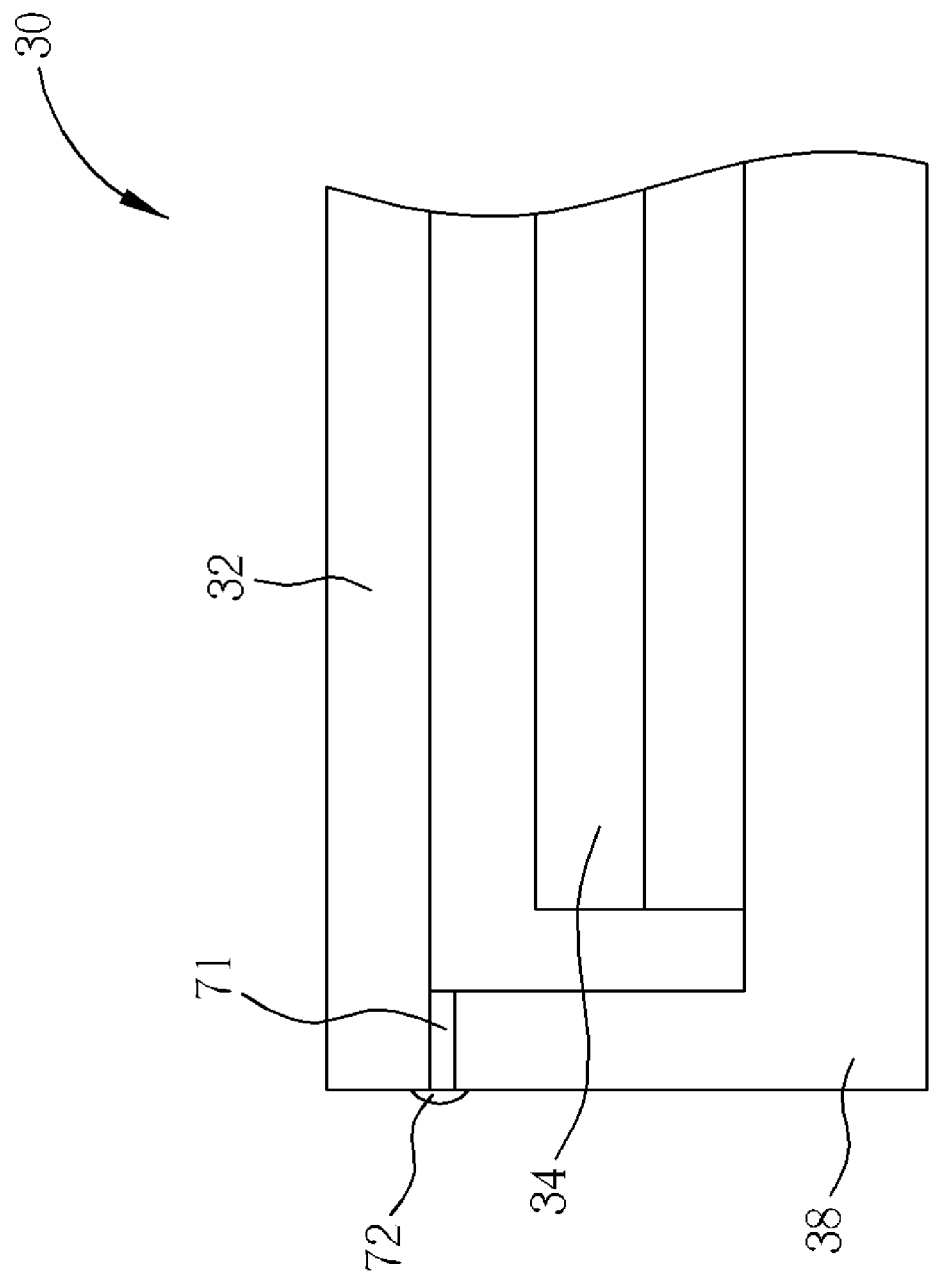
FIG. 7 is a cross-sectional view of a seam of the LCOS package structure.

Please refer to FIG. 6, which shows a cross-sectional view of another embodiment according to the present invention. This embodiment differs from the LCD display module 30 shown in FIG. 5, in that the LCD display module 60 shown in FIG. 6 has no air gap between the transparent cover 32 and the LCD panel 34. Sometimes, a double air gap occurs as the LCD display module 30 is adhered to an optical module (not shown) also having an air gap, reducing the optical quality. To prevent such a problem from occurring, the LCD display module 60 has a vacuumed room if the transparent cover 32 is not adhered to the LCD panel 34.

Please refer to FIG .7, which shows a cross-sectional view of a seam of the LCOS package structure. The adhesive 71, which may be epoxy UV glue or a silicon based UV glue, is used to adhere the transparent cover 32 and the heat sink 38, and the supporter 59 and the heat sink 38, so that the LCD panel 34 can be sealed into the LCD display module 30, achieving the objectives of water-proofing, dust-prevention, air tightness and heat dissipation. In addition, a water-proof glue 72 can also be smeared on the seam to enhance the effects of water-proofing, dust-prevention, and air tightness of the LCD display module 30. The adhesive 71 and the water-proof glue 72 can be considered a first adhesive and a second adhesive, respectively.

Compared to the prior art, the present invention LCD display module comprises an LCD panel positioned on a heat sink for heat-dissipation, and a transparent cover for dust-prevention. Such a design is capable of not only rapidly dissipating the heat generated by the LCD panel, but also preventing dust and unwanted reflection from damaging optical quality. Furthermore, the air tightness and water-proof requirements of the LCD display module can be realized by using double adhesives to adhere the heat sink and the transparent cover. Such a design is simple and efficient for maintaining the LCD module quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A package structure for packaging a liquid crystal panel comprising:
   a heat sink for dissipating heat generated by the liquid crystal panel positioned on the heat sink;
   a transparent cover located above the liquid crystal panel; and
   a supporter made of glass located between the transparent cover and the heat sink, and directly contacting the transparent cover.

2. The package structure of claim 1 further comprising a circuit carrier electrically coupled to the liquid crystal panel.

3. The package structure of claim 1 further comprising an adhesive for adhering the transparent cover to the heat sink to seal the liquid crystal panel between the transparent cover and the heat sink.

4. The package structure of claim 1, wherein the transparent cover is attached to the liquid crystal panel.

5. The package structure of claim 1, wherein the transparent cover comprises a mask.

6. The package structure of claim 1, wherein the transparent cover is made of glass.

7. The package structure of claim 1, wherein the heat sink is made of metal.

8. The package structure of claim 1, wherein the Liquid crystal panel is a Liquid Crystal on Silicon Panel (LCOS Panel).

9. The package structure of claim 8, wherein the liquid crystal panel further comprises a color filter.

* * * * *